July 11, 1950
O. O. OAKS
2,514,718
HEATING MOLD
Filed Sept. 26, 1947
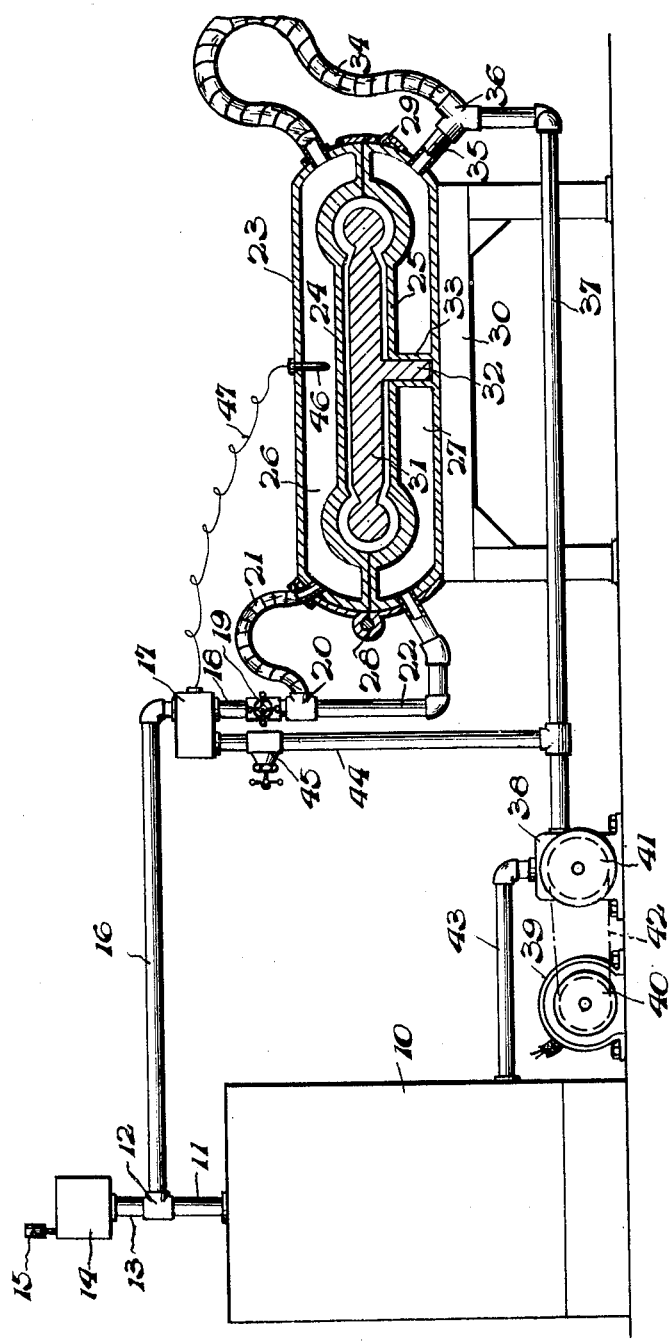
INVENTOR.
ORION O. OAKS
BY
Cameron, Kerkam, & Sutton
Attorneys Patented July 11, 1950

2,514,718

UNITED STATES PATENT OFFICE 2,514,718

HEATING MOLD

Orion Ottis Oaks, Summit, N. J., assignor, by mesne assignments, to Thermal Liquids, Inc., New York, N. Y., a corporation of Delaware Application September 26, 1947, Serial No. 776,318

1 Claim. (Cl. 18—38)

This invention relates to a system and apparatus for heating molds and more particularly to such a system and apparatus employing a particular class of chemical compounds, the tetra-aryl ortho silicates, as the heat transfer medium.

Heretofore many types of heated molds have been employed. Molds requiring relatively high temperatures, as in the case of vulcanization of rubber, are necessarily large, heavy and expensive to withstand the pressures of superheated steam employed to provide mold heating. On the other hand, molds employing tetra-aryl ortho silicate as the heat transfer medium may be light and inexpensively built due to the characteristics of these compounds. The tetra-aryl ortho silicates are described in the Johnston patent, No. 2,335,012, dated November 23, 1943. As there described these compounds boil in the neighborhood of 700° F. and may be circulated at −60° F. Within this temperature range they form an ideal heat transfer medium and have no vapor pressure.

It is accordingly an object of my invention to provide a novel system and apparatus for heating molds in which a particular class of chemical compounds is employed as the heat transfer medium.

Another object is to provide such a system and apparatus employing tetra-aryl ortho silicate as the heat transfer medium.

Another object is to provide such a system and apparatus in which high molding temperatures may be reached without the use of expensive, heavy and complicated structures.

Another object is to provide such a system and apparatus in which the heat available for molding is efficiently used.

Another object is to provide such a system and apparatus which is efficient in operation, relatively simple in construction, and relatively cheap and easy to use and to incorporate into existing molds.

Other and further objects of the present invention will appear from the following description.

My invention is capable of embodiment in various mechanical forms and can be used in many types of molding operations. One embodiment of my invention as applied to the molding of automobile tires is shown in the accompanying drawing and is described hereafter to illustrate the invention. This should in no way be construed as defining or limiting my invention and reference should be had to the appended claims for this purpose.

In this drawing 10 is any suitable boiler heated by coal, gas, oil, electricity or any other suitable means and designed to heat the tetra-aryl ortho silicate employed as the heat transfer medium. Heated tetra-aryl ortho silicate is taken from boiler 10 through pipe 11 to pipe coupling 12. Pipe 13 leads from coupling 12 to a suitable expansion tank 14 included in the system to allow for the expansion and contraction of the tetra-aryl ortho silicate during heating and cooling. Since the system for circulating the tetra-aryl ortho silicate is preferably, though not necessarily, a closed system a pressure and vacuum responsive relief valve 15 is provided opening into tank 14. Valve 15 is normally closed and is designed to open only under subnormal and dangerous conditions of pressure or vacuum in the system.

Pipe 16 communicates with coupling 12 and connects with thermostatically controlled valve 17. Pipe 18 leads from valve 17 to manually operable flow control valve 19 which is connected to coupling 20. A flexible conduit 21 and pipe 22 lead from coupling 20.

The tire mold illustrated is indicated generally at 23 and comprises upper and lower mold elements 24 and 25 respectively of the lightest construction consistent with their functions and are provided with light weight jackets 26 and 27. Jackets 26 and 27 may be of the lightest possible weight since the tetra-aryl ortho silicate has no vapor pressure when heated up to 700° F. and only a minimum pressure need be exerted to circulate the tetra-aryl ortho silicate in the system. Mold elements 24 and 25 and jackets 26 and 27 are hinged together at 28 for ready opening and closing and may be locked together when in closed position by any suitable lock 29. Mold 23 may be suitably supported as by table 30. When required, a core 31 may be supported within mold 23 and held in position by pedestal 32 fitted into socket 33 formed in jacket 27.

Flexible conduit 21 opens into jacket 26 and pipe 22 opens into jacket 27. Tetra-aryl ortho silicate is removed from jacket 26 through flexible conduit 34 and is removed from jacket 27 by pipe 35. Conduit 34 and pipe 35 unite at 36 and connect into return pipe 37. Pipe 37 communicates with the intake side of a suitable pump 38. Pump 38 is driven by motor 39, pulleys 40 and 41 and belt 42. Pump 38 discharges into pipe 43 which is connected to the return side of boiler 10.

A by-pass 44 including a normally operable flow control valve 45 is connected between thermostatically controlled valve 17 and return pipe 37. Valve 17 is actuated by a conventional bulb 46 subject to the temperature of the tetra-aryl ortho silicate in jacket 26. Bulb 46 is connected to valve 17 by tubing 47.

With the embodiment of my invention set up as above described when it is desired to use the same, boiler 10 is fired and the tetra-aryl ortho silicate therein heated. Motor 39 and pump 38 are started and valve 17 set for the desired molding temperature. Heated tetra-aryl ortho silicate is now circulated through pipes 11 and 16 to valve 17 and into pipe 18, valve 19, flexible conduit 21 and pipe 22. The heated tetra-aryl ortho silicate circulates from conduit 21 and pipe 22 into jackets 26 and 27, respectively, and is removed therefrom by conduit 34 and pipe 35. Return pipe 37, pump 38, and pipe 43 complete the system returning the tetra-aryl ortho silicate to boiler 10. Circulation of heated tetra-aryl ortho silicate in jackets 26 and 27 heats mold elements 24 and 25. When mold elements 24 and 25 reach molding or vulcanizing temperatures, latch 29 is released and mold 23 is opened about hinge 28. Core 31 with a tire carcass mounted thereon is then placed in the mold by engaging pedestal 32 in socket 33 and the mold is closed and locked. Heated mold elements 24 and 25 now vulcanize the tire carcass in the conventional way.

Should the temperature of the tetra-aryl ortho silicate in the jackets exceed desirable molding temperatures and the temperature for which valve 17 is preset, bulb 46 will actuate valve 17 to close pipe 18 and open by-pass 44 circulating the heated tetra-aryl ortho silicate around mold 23 until such time as the tetra-aryl ortho silicate in jackets 26 and 27 cools below this temperature. Bulb 46 then actuates valve 17 to close by-pass 44 and to reopen pipe 18. A close and accurate temperature control of molding temperatures is thus obtained.

It is to be understood that manually operable flow control valves 19 and 45 may be adjusted to give any desired rate of flow in the portions of the piping system which they control.

It is now apparent that by the present invention I have provided a novel system and apparatus for mold heating utilizing a particular class of chemical compounds, the tetra-aryl ortho silicates, as the heat transfer medium which permits high molding temperatures to be reached and accurately maintained with efficient use of available heat with relatively light, inexpensive and simple apparatus.

To those skilled in the art changes to or modifications of the above described illustrative embodiment of my invention may now be suggested without departing from my inventive concept. Reference should therefore be had to the appended claim to determine the scope of my invention.

What is claimed is:

In a system and apparatus as described employing tetra-aryl orthosilicate as a heat transfer medium, means for heating the heat transfer medium, a substantially vertically disposed supply pipe leading from said heating means, a closed expansion tank connected to said supply pipe above said heating means, normally closed pressure and vacuum relief means connected into said expansion tank, a mold to be heated by the heat transfer medium, a pipe connecting to said supply pipe between said heating means and said expansion tank and connected to the supply side of said mold, a return pipe connected to the return side of said mold and to the return side of said heating means, a pump in said return pipe adjacent said heating means, a three-way thermostatically controlled valve subject to the heat of the mold and connected in the pipe supplying the heated heat transfer medium to the mold, and a by-pass connected to said return pipe and to said thermostatically controlled valve.

ORION OTTIS OAKS.

REFERENCES CITED

The following references are of record in the file of this patent:

UNITED STATES PATENTS

| Number | Name | Date |
| --- | --- | --- |
| 1,440,926 | MacDonald | Jan. 2, 1923 |
| 1,620,322 | Browne | Mar. 8, 1927 |
| 1,632,394 | Fairchild | June 14, 1927 |
| 1,757,053 | Minor | May 6, 1930 |
| 2,173,588 | Mahler | Sept. 19, 1939 |
| 2,335,012 | Johnston | Nov. 23, 1943 |
| 2,335,778 | Martin-Hurst | Nov. 30, 1943 |